(12) United States Patent  
Stutzmann

(10) Patent No.: US 7,380,393 B2  
(45) Date of Patent: Jun. 3, 2008

(54) WINDROWER FOR PLANT MATTER WITH THREE RAKING WHEELS

(75) Inventor: Olivier Stutzmann, Zilling (FR)

(73) Assignee: Kuhn S.A., Saverne (FR)

( * ) Notice: Subject to any disclaimer, the term of this patent is extended or adjusted under 35 U.S.C. 154(b) by 137 days.

(21) Appl. No.: 11/229,711

(22) Filed: Sep. 20, 2005

(65) Prior Publication Data

US 2006/0059881 A1    Mar. 23, 2006

(30) Foreign Application Priority Data

Sep. 23, 2004    (FR) .................................. 04 52142

(51) Int. Cl.
*A01D 78/00*    (2006.01)

(52) U.S. Cl. .......................................... 56/377; 56/367

(58) Field of Classification Search ........... 56/192.344, 56/367, 379, 365, 370, 372, 375–380, 384, 56/385, 396, 397
See application file for complete search history.

(56) References Cited

U.S. PATENT DOCUMENTS

| 2,511,841 | A | * | 6/1950 | Gaterman | 56/193 |
| 3,638,977 | A | * | 2/1972 | Purrer | 403/93 |
| 4,366,666 | A | * | 1/1983 | van der Lely et al. | 56/370 |
| 4,409,780 | A | * | 10/1983 | Beougher et al. | 56/228 |
| 4,685,282 | A | * | 8/1987 | Allen | 56/377 |
| 6,050,076 | A | * | 4/2000 | Aron et al. | 56/366 |
| 6,109,012 | A | * | 8/2000 | Staal et al. | 56/367 |
| 2002/0000083 | A1 | * | 1/2002 | Van den Engel | 56/365 |
| 2005/0126153 | A1 | | 6/2005 | Hironimus et al. | |

FOREIGN PATENT DOCUMENTS

EP    0 706 751 A1    4/1996
EP    1 060 651 A1    12/2000

* cited by examiner

*Primary Examiner*—Thomas B Will
*Assistant Examiner*—Mai T Nguyen
(74) *Attorney, Agent, or Firm*—Oblon, Spivak, McClelland, Maier & Neustadt, P.C.

(57) ABSTRACT

A haymaking machine, particularly a windrower for plant matter lying on the ground, comprising a frame bearing three raking wheels having soil resting wheels and raking forks, driven in rotation about support axes in a work position, which raking wheels are connected by carrying arms to the frame. The three raking wheels can be placed in a work position on the ground in which position the three raking wheels are substantially in the same plane and can be placed in a transport position in which the three planes formed by the three raking wheels are different and substantially perpendicular two by two.

14 Claims, 2 Drawing Sheets

WINDROWER FOR PLANT MATTER WITH THREE RAKING WHEELS

BACKGROUND OF THE INVENTION

1. Field of the Invention

The present invention relates to a haymaking machine, particularly to a windrower for mown plant matter, comprising a frame with three raking windrowing wheels, which raking wheels are driven during work about substantially vertical axes and can be configured into a position of minimum space-occupancy for transport that does not exceed the heights and widths permissible for travel on the public highway.

2. Discussion of the Background

Various windrowers having several raking wheels are already known and used in agricultural concerns, these machines usually forming several windrows, one per raking wheel, and having a working width that is directly dependent on the number of raking wheels and on the diameter thereof.

Windrowers comprising raking wheels aligned at right angles to the direction of travel are known from document EP 465 393 or EP 1 142 468. All these machines propose folding the raking wheels vertically, in a position at 90° with respect to the work position for the transport of the machine. This transport configuration may lead to the folded machine having a significant height and consequently occupying an important amount of space that is incompatible with the roadways that are to be used.

Indeed, given the permissible heights and widths for these public highways, arrangements have to be made for the machine to be transported as an "exceptional load", which entails an additional vehicle equipped with a flashing light and the requisite personnel. This type of expensive displacement has to be planned ahead, and this is not always possible for the farmer to achieve, particularly if he is working alone.

For reasons of productivity it is also desirable to produce large-capacity windrowers which are able to gather the fodder together in a single windrow collected from the largest possible area of ground, namely a machine that allows a minimum number of passes over the field, these machines are therefore designed with raking wheels of large diameter and the number of which is as high as is technically feasible.

These large-capacity windrowers therefore present problems of transport when moving them from one working space to another along the public highway.

As already mentioned, there are windrowers that have raking wheels that are aligned in a plane perpendicular to the direction of forward travel of the tractor, these machines are restricted in terms of dimensions because of the folding configurations that can be achieved and because of their design which does not allow the fodder to be gathered together into a single large windrow per pass.

In consequence, the compromise that can be reached between the size of the machine, particularly the size of the raking wheels, against the need to transport the machine easily from one work site to another, and against the number of windrows formed is very unfavorable for windrowers of this type.

Machines with raking wheels offset in the opposite direction from the direction of travel of the tractor in order to collect several zones in a single pass and gather them together into a single windrow have been conceived. This way of raking the field allows the number of passes of the machine tasked with the subsequent collection of the fodder to be reduced.

An example of such a windrower with offset raking wheels is described in document EP 1 290 936, although, as in the case of the in-line raking wheels described earlier, a compromise has to be reached between the permissible length of the machine coupled behind the tractor and the number of raking wheels that can be set out in this way. The problem of siting a large number of raking wheels on the machine while having the most compact transport configuration possible still arises.

SUMMARY OF THE INVENTION

It is therefore an objective of the invention to overcome the drawbacks of the known machines by proposing a windrower which has a very large working width and can be folded for transport at the road-going track width and that requires no special authorization for moving it from one work site to another.

The invention relates to a haymaking machine, particularly a windrower for plant matter lying on the ground, comprising a frame bearing three raking wheels having soil resting wheels and raking forks, driven in rotation about support axes in a work position, which raking wheels are connected by carrying arms to the frame, which haymaking machine is one wherein the three raking wheels can be placed in a work position on the ground in which position the three raking wheels are substantially in the same plane and can be placed in a transport position in which the three planes formed by the three raking wheels are different and substantially perpendicular two by two.

The advantages of a haymaking machine according to the invention are numerous:
- such a machine allows work to be carried out over great widths with good maneuverability while at the same time raking gently.
- The compactness of the folded position allows the machine to be transported on all roads and tracks and makes it easier to put away.
- The special folding of the windrower in the transport position allows the use of a shorter length towed assembly.
- The switch between the transport position and the work position is rapid and can be performed from the tractor.
- The displacement of the fodder into a single large-volume windrow makes it possible to optimize the passes over the fields both for windrowing and for subsequent collection.

BRIEF DESCRIPTION OF THE DRAWINGS

Other characteristics and advantages of the invention will become apparent from the description which will follow with reference to the attached drawings which are given solely by way of nonlimiting examples.

DESCRIPTION OF THE PREFERRED EMBODIMENT

Figure 1:
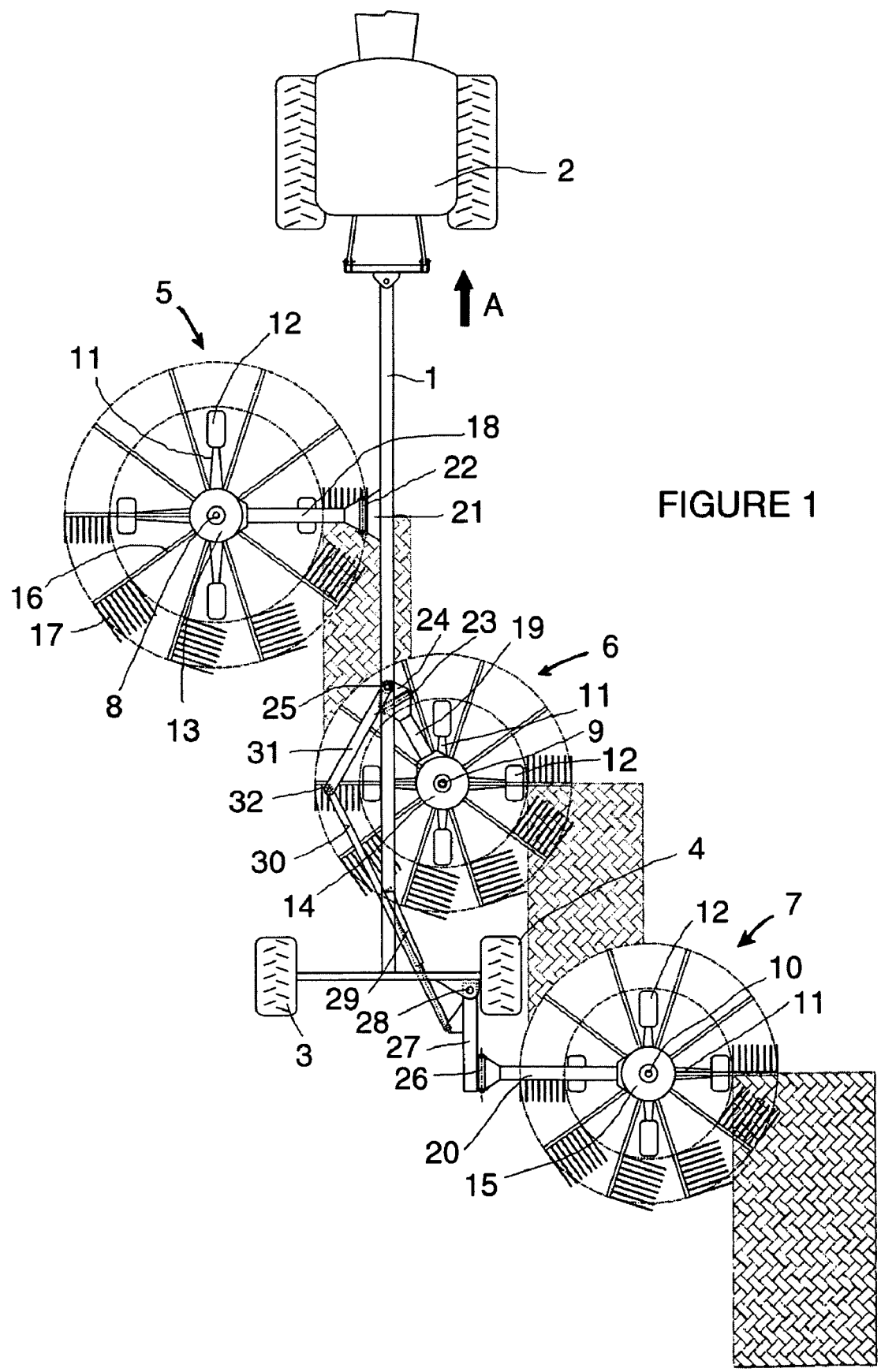
FIG. 1 is a view from above of a machine according to the invention in the work position.
Figure 2:
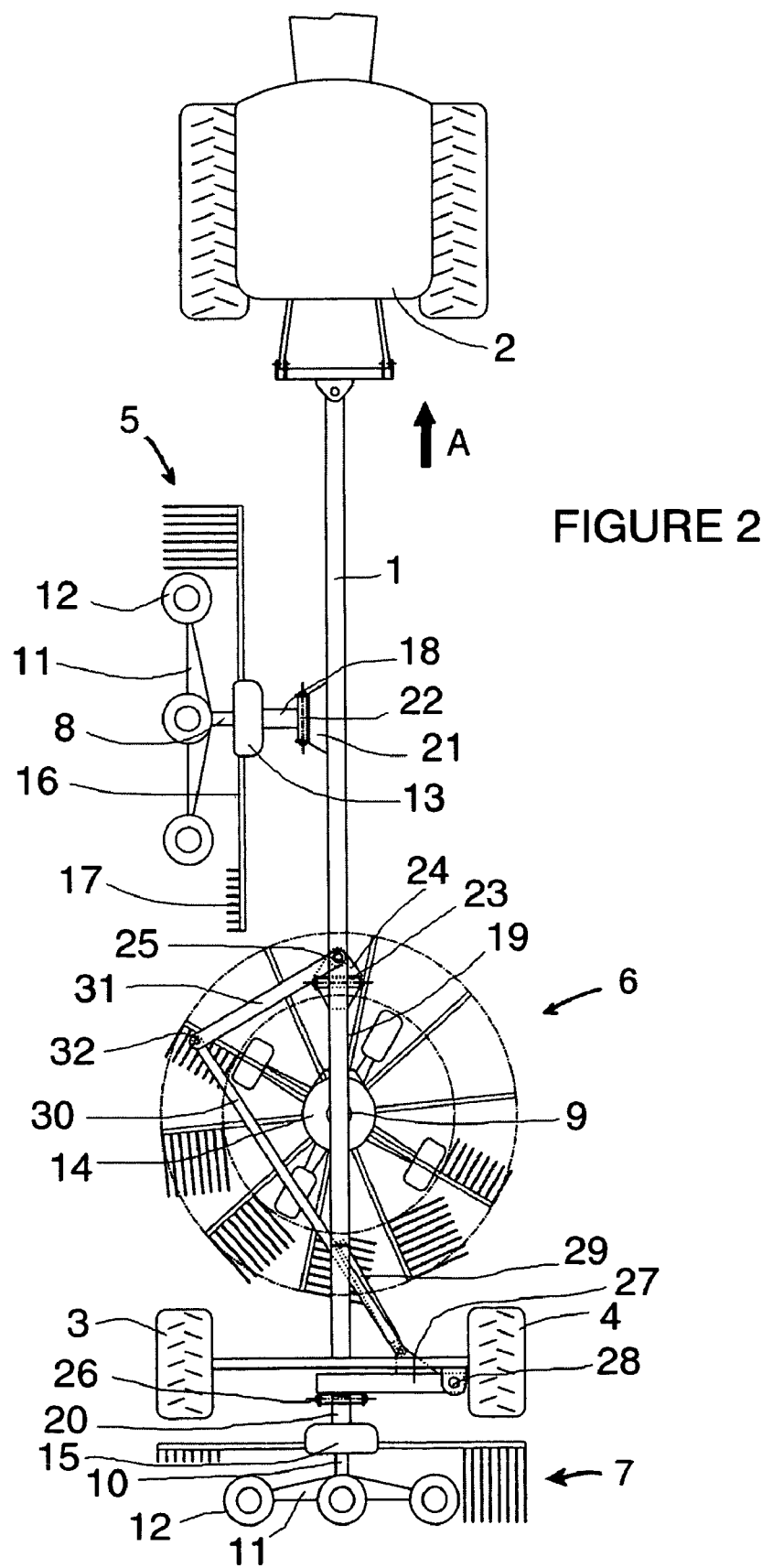
FIG. 2 is a view from above of a machine according to the invention in the transport position.

As depicted in FIGS. 1 and 2, the machine according to the invention comprises an elongate frame 1 in the shape of an inverted T which can be coupled by means of a coupling device to a tractor 2 and rests on the ground by virtue of two wheels 3 and 4.

The machine is hitched to a tractor which moves it in the direction of the arrow A.

The frame 1 bears three raking wheels 5, 6 and 7 mounted to rotate about substantially vertical axes 8, 9 and 10.

The three raking wheels 5, 6 and 7 are of substantially identical design and at the lower end of the axes 8, 9 and 10 bear supports 11 equipped with four soil resting wheels 12. These supports are hydraulically height-adjustable with respect to the corresponding axes 8, 9 and 10 so that the distance between the relevant raking wheel and the ground can be altered. The four soil resting wheels 12 allow the raking wheels to correctly take up the collecting surface thus giving the machine maximum efficiency.

Each of the raking wheels 5, 6 and 7 is essentially made up of a central casing 13, 14, 15 mounted on a corresponding axis 8, 9, 10 by means of ball bearings. This central casing 13, 14, 15 bears several arms 16 which extend in a practically horizontal plane when the machine is in the work position for raking.

The arms 16 are equipped at their ends furthest from said casing 13, 14, 15 with raking forks 17.

Each of these arms 16 is mounted in a bearing of the central casing 13, 14, 15 in such a way as to be able to pivot on itself, that is to say about its longitudinal geometric axis. In the central casing 13, 14, 15, there is an operating cam which is fixed to the corresponding axis 8, 9, 10.

Each tine-bearing arm 16 has, at its end situated inside the central casing 13, 14, 15, a roller which collaborates with said operating cam.

The raking wheels described here are known and used in several machines such as those cited in documents EP 772 969 or EP 1 142 468.

During work, the three raking wheels 5, 6, 7 rest on the ground, they all three rotate in the same direction, which direction is clockwise in the view from above as illustrated in FIG. 1, and collaborate to form a large-volume lateral windrow.

According to the invention, the three raking wheels 5, 6, 7 are placed at the end of the arms 18, 19, 20 allowing them to be positioned in line and in an offset position with respect to the forward travel A of the tractor 2, so as to cover a maximum working area.

When the machine is operating, the raking area of the second raking wheel 6 partially overlaps that of the first wheel 5, and that of the third wheel 7 partially overlaps that of the second wheel 6, as illustrated in FIG. 1, so as to constitute a large-volume lateral windrow.

According to the invention, the three raking wheels 5, 6 and 7, in the working position on the ground, are aligned and offset in the opposite direction to the direction of forward travel of the tractor by an amount which substantially corresponds to their diameter. The developed working width is of the order of 9 to 10 meters depending on the diameter chosen for the raking wheels 5, 6 and 7.

With respect to the frame 1, and in the view from above depicted in FIG. 1, the first raking wheel 5 is situated closest to the tractor, on the left-hand side of the frame 1. The central second raking wheel 6 is slightly offset on the opposite side of the frame 1 with respect to the raking wheel 5 and the third raking wheel 7 is, for its part, on the right-hand side, at the end furthest from the tractor.

According to this configuration, the fodder gathered together by the raking wheel 5 is deposited in the path of the raking wheel 6 which also covers its own collection area. The combined collection performed by the raking wheels 5 and 6 is then picked up by the raking wheel 7 which lays the windrow down laterally with respect to the tractor in a single large-volume row.

According to the invention, the raking wheel 6 is slightly offset to the right with respect to the axis of the frame 1 so that the wheel 4 is not in the path of the windrow of said raking wheel 6 and does not compact the fodder, as this would degrade it and cause difficulties in its collection by the raking wheel 7.

As illustrated in FIG. 1, the raking wheel 7 is offset outwards with respect to the wheel 4 supporting the frame 1.

In the invention, the arms 18, 19, 20 are connected to the frame 1 in various configurations.

The arm 18, situated on the left-hand side of the frame at 90° with respect to the latter when the windrower is in the work position, is articulated to a support 21 secured to the frame 1 by a substantially horizontal axis 22 directed in the direction of forward travel A.

The arm 19 bearing the raking wheel 6 is articulated by means of a substantially horizontal axis 23 to a support 24. Said support 24 is itself articulated by means of a substantially vertical axis 25 to the frame 1.

The arm 20 bearing the raking wheel 7 is articulated by means of a substantially horizontal axis 26 to a second arm 27 which is articulated to the frame 1 using a substantially vertical axis 28.

This second arm 27 can be moved about the substantially vertical axis 28 by means of a hydraulic ram 29. The arm 27 is also connected through a rod 30 to a lever 31 which is secured to the support 24 of the arm 19 supporting the second raking wheel 6.

The rod 30 and the lever 31 are articulated about a substantially vertical axis 32, this rod assembly allowing a coordinate movement between the arms 19 and 20 as the raking wheels are moved into the transport position or into the work position.

The transport position illustrated in FIG. 2 shows the original folding of the three raking wheels according to the invention about the frame 1 in a configuration of minimum space occupancy.

For transporting the windrower, the carrying arms 18 and 20 are lifted up by pivoting through 90° about the axes 22 and 26 by means of hydraulic rams which have not been depicted in FIGS. 1 and 2, into a substantially vertical position.

The raking wheel 5 is pivoted through 90° about the axis 22 to clear the forks 17 from the ground and result in the transport configuration.

The second raking wheel 6 is raised slightly about the articulation 23 to move it clear of the ground, it is also moved about the substantially vertical articulation axis 25 so as to center it with respect to the frame 1. This movement is combined with the movement described hereinafter of the raking wheel 7.

The third raking wheel 7 is lifted up vertically about the articulation axis 26 and is folded using the second arm 27 by about 90° towards the frame 1 about the axis 28. This folding is performed by means of the hydraulic ram 29. At the same time, the rod 30 actuates the lever 31 in such a way that the latter moves the second raking wheel 6 into the position described hereinabove.

Thus, in the windrower in the transport position, the raking wheel 5 is situated in a vertical plane parallel to that of the major axis of the frame 1, the raking wheel 6 is in a horizontal plane parallel to that of the plane of work and the raking wheel 7 is in a vertical plane perpendicular to that of the major axis of the frame 1 and to the direction of forward travel A of the tractor 2.

According to the invention, the switch from the work position to the transport position, and vice versa, are performed from the tractor and achieved automatically by means of hydraulic rams connected to the tractor hydraulic system.

As a preference, according to the invention, devices for locking the raking wheels in their transport position are planned, so as to avoid any risk of accident, such safety means are known in the art.

The dimensions of the raking wheels can vary and it is conceivable to produce a raking wheel 5 with a larger diameter than the other ones, or even three wheels with different diameters, without departing from the scope of the invention, so that the machine develops the greatest possible working area.

The diameters of the raking wheels 6 and 7 are limited by the space occupied by the machine for road transport. Typically, these wheels may be identical and smaller than 3 meters in diameter or may be configured so that their diameter corresponds to the maximum width allowed for transport at the standard road-going track width. The raking wheels 5, 6 and 7 may also be equipped with arms 16 that can be partially removable or foldable in order to reduce their dimensions for transport still further.

Once the three raking wheels 5, 6 and 7 have been moved into the transport position, the width, height and length of the machine are reduced and the machine can easily be moved along roads and tracks. The limited space-occupancy in the three dimensions also makes the machine easier to put away at the farm.

Various alternative forms are possible without departing from the scope of the invention; in particular, it may be envisaged for a windrowing deflector extending laterally with respect to the raking wheel 7 to be fitted. This deflector may be produced in the form of a grating or cloth directed in the direction of forward travel A.

Various configurations for coupling the haymaking machine to the tractor are conceivable, the frame may be substantially elongate and the various elements described may have various dimensions, the raking wheels may contain a greater or smaller number of arms and forks and may be actuated in various ways without departing from the scope of the invention.

Of course, the invention is not restricted to the embodiments described and depicted by way of examples but also encompasses all technical equivalents and combinations thereof.

What is claimed as new and desired to be secured by letters patent of the united states is:

1. A windrower for plant matter lying on the ground, comprising a frame bearing three raking wheels having soil resting wheels and raking forks, driven in rotation about support axes in a work position, wherein the three raking wheels are connected by carrying arms to the frame, wherein the three raking wheels can be placed in a work position on the ground in which work position the three raking wheels are substantially in a same plane and can be placed in a transport position in which the three raking wheels are placed in three different planes, each of said three different planes being substantially perpendicular to the other two,
wherein the three raking wheels are substantially aligned in the work position and are offset in the opposite direction to a direction of forward travel of a tractor configured to pull the windrower by an amount that substantially corresponds to their diameter.

2. The windrower as claimed in claim 1, wherein,
in the work position, the three raking wheels are substantially in a horizontal plane; and
in the transport position, a first raking wheel is situated in a vertical plane parallel to that of the major axis of the frame, a second raking wheel is in a horizontal plane parallel to that of the horizontal plane of the work position and a third raking wheel is in a vertical plane perpendicular to that of the major axis of the frame and to the direction of forward travel of the tractor.

3. A windrower for plant matter lying on the ground, comprising a frame bearing three raking wheels having soil resting wheels and raking forks, driven in rotation about support axes in a work position, wherein the three raking wheels are connected by carrying arms to the frame, wherein the three raking wheels can be placed in a work position on the ground in which work position the three raking wheels are substantially in a same plane and can be placed in a transport position in which the three raking wheels are placed in three different planes, each of said three different planes being substantially perpendicular to the other two,
wherein the carrying arm of a first raking wheel and the carrying arm of a second raking wheel are articulated to the frame in such a way as to be able to pivot about substantially horizontal articulation axes and wherein the carrying arm of a third raking wheel can pivot about a substantially horizontal axis and is connected to a second arm which is articulated to the frame and can move about a substantially vertical axis.

4. The windrower as claimed in claim 2, wherein, in order to place the second raking wheel and the third raking wheel in the transport position, their carrying arms have a movement that is coordinated by way of a rod secured to a second arm bearing the third raking wheel, and of a lever secured to a support of the arm supporting the second raking wheel, which lever and which rod are connected to one another about a substantially vertical axis.

5. The windrower as claimed in claim 2, wherein the second raking wheel, in the work position, is slightly laterally offset with respect to the axis of the frame, through pivoting its carrying arm about a substantially vertical articulation axis.

6. The windrower as claimed in claim 2, wherein at least one of the three raking wheels is of different dimensions from the others.

7. The windrower as claimed in claim 6, wherein the first raking wheel has a larger diameter than the other raking wheels and wherein these raking wheels have identical diameters.

8. The windrower as claimed in claim 1, wherein the three raking wheels are identical.

9. The windrower as claimed in claim 2, wherein said windrower has a work length and a work width in said work position, and has a transport length and a transport width in said transport position, wherein said transport length is less than said work length and said transport width is less than said work width.

10. The windrower as claimed in claim 9, wherein the second raking wheel is between the first and third raking wheels and is in a horizontal plane in said transport position, said horizontal plane being parallel to the plane of the work position.

11. The windrower as claimed in claim 9, wherein the second raking wheel, in the work position, is laterally offset with respect to the axis of the frame.

12. The windrower as claimed in claim 11, wherein the second raking wheel, in the transport position, is laterally aligned with the axis of the frame.

13. The windrower as claimed in claim 11, wherein each of the three raking wheels is equipped with four wheels that rest on soil in the work position.

14. A windrower for plant matter lying on the ground, comprising a frame bearing three raking wheels having soil resting wheels and raking forks, driven in rotation about support axes in a work position, wherein the three raking wheels are connected by carrying arms to the frame, wherein the three raking wheels can be placed in a work position on the ground in which work position the three raking wheels are substantially in a same plane and can be placed in a transport position in which the three raking wheels are placed in three different planes, each of said three different planes being substantially perpendicular to the other two, wherein in the work position, each of the three raking wheels is laterally offset with respect to the axis of the frame, and said three raking wheels are not symmetrically positioned about said axis of the frame.

* * * * *